US009664529B2

United States Patent
Shah et al.

(10) Patent No.: US 9,664,529 B2
(45) Date of Patent: May 30, 2017

(54) DETERMINING INSTALLATION LOCATIONS FOR METERS

(75) Inventors: Amip J. Shah, Santa Clara, CA (US); Geoff M. Lyon, Half Moon Bay, CA (US); Allison Littman, Lebanon, TN (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 56 days.

(21) Appl. No.: 14/417,227

(22) PCT Filed: Jul. 31, 2012

(86) PCT No.: PCT/US2012/049081
§ 371 (c)(1),
(2), (4) Date: Jan. 26, 2015

(87) PCT Pub. No.: WO2014/021880
PCT Pub. Date: Feb. 6, 2014

(65) Prior Publication Data
US 2015/0168177 A1   Jun. 18, 2015

(51) Int. Cl.
*G08B 23/00*   (2006.01)
*G08C 15/06*   (2006.01)
*G01D 3/00*   (2006.01)
*G06Q 50/06*   (2012.01)

(52) U.S. Cl.
CPC .............. *G01D 3/00* (2013.01); *G06Q 50/06* (2013.01)

(58) Field of Classification Search
CPC ................................. G01D 3/00; G06Q 50/06
USPC .................................................. 340/870.02
See application file for complete search history.

(56) References Cited

U.S. PATENT DOCUMENTS

| 6,867,707 | B1 | 3/2005 | Kelley et al. | |
|---|---|---|---|---|
| 7,373,268 | B1 | 5/2008 | Viredaz et al. | |
| 2002/0177911 | A1* | 11/2002 | Waugh | G06F 17/50 700/30 |
| 2007/0005275 | A1 | 1/2007 | Bickel et al. | |
| 2010/0305923 | A1 | 12/2010 | Shah et al. | |
| 2010/0306151 | A1* | 12/2010 | Bickel | G01D 4/002 706/46 |
| 2011/0029152 | A1 | 2/2011 | Patel et al. | |

(Continued)

FOREIGN PATENT DOCUMENTS

KR   1020120070903 A   7/2012
WO   WO-2009061291 A1   5/2009

OTHER PUBLICATIONS

PCT Search Report/Written Opinion—Application No. PCT/US2011/049081 dated Mar. 29, 2013—11 pages.

*Primary Examiner* — Tanmay Shah
(74) *Attorney, Agent, or Firm* — International IP Law Group, PLLC

(57) ABSTRACT

A system and method for determining installation locations for meters are disclosed herein. The method includes generating, via a computing device, a resource map for a site, wherein the resource map includes inflow locations and corresponding outflow locations for a resource. The method also includes identifying a number of tiers within the resource map based on the inflow locations and the corresponding outflow locations for the resource. The method further includes determining a number of recommended installation locations for meters based on the tiers.

15 Claims, 6 Drawing Sheets

(56) References Cited

U.S. PATENT DOCUMENTS

2011/0099043 A1    4/2011   Sharma et al.
2011/0264277 A1   10/2011   Shah et al.

* cited by examiner

500

DETERMINING INSTALLATION LOCATIONS FOR METERS

BACKGROUND

Monitoring resource consumption of commercial buildings is becoming increasingly desirable, especially as resource prices increase and corporate sustainability reporting becomes more common. As a means to decrease cost, specific equipment with high resource demands is often targeted for upgrades or replacement. However, existing site-level metering techniques do not allow for the identification of such equipment.

Although metering solutions have been used to monitor and report flows of resources, few are available at a cost low enough for metering to penetrate the lower-level end loads of resource use. Thus, detailed analysis becomes difficult, and resource use at the end load level is often unclear. Quantifying resource use at such lower-level end loads is desirable, since opportunities for resource use reduction often exist at the lower-level end loads.

Smart meters have been deployed across a wide range of buildings and campuses to assess the consumption of resources. However, the cost of smart meters often restricts smart meter instrumentation to site-level data collection. Although such high-level metering provides sufficient data to extract summary statistics about the overall resource consumption of a site, such meters fail to provide adequate detail about the specific manner by which resources are being consumed.

Current disaggregation techniques may be used to gain insight into the types of loads underlying a front-end metering location by allowing for the analysis of consumption data based on individual areas within a site. However, current disaggregation techniques are generally limited to small-scale installations, such as homes, or utilize specialized hardware, such as high-frequency sampling, in order to gain insights. Therefore, disaggregation techniques have historically been of limited use in commercial or industrial environments.

Another technique that is currently used within the industry involves branch metering of homogeneous loads. For example, by installing a single meter on a branch for which the loads are known to be exclusively lighting, one can disaggregate the fraction of energy going towards lighting. However, such homogeneous branches are generally only found in newer buildings or buildings with a small number of loads. By contrast, for the large base of commercial and industrial sites that were built a decade or more ago, the loads on a given branch are rarely homogeneous. Thus, top-level meters typically do not provide appropriate insight into end load use.

In addition, some customers have installed large numbers of meters in order to generate real-time insights into resource use. However, such an approach typically incurs fairly large costs and, thus, is generally not viable for mass deployment across a large number of sites.

BRIEF DESCRIPTION OF THE DRAWINGS

Certain examples are described in the following detailed description and in reference to the drawings, in which.

DETAILED DESCRIPTION OF SPECIFIC EXAMPLES

Techniques described herein relate generally to the determination of installation locations for metering devices. More specifically, techniques described herein relate to the determination of installation locations for smart meters according to a multi-tier advanced metering infrastructure (AMI). As used herein, the term "smart meter" refers to a metering device that provides network connectivity and, thus, allows for consumption data to be transmitted back to a central station, or utility, on a periodic basis, e.g., according to a specific transmission rate. For example, a smart meter may transmit consumption data back to the central station every five minutes, every fifteen minutes, or every hour. The transmission rate for a smart meter may be a function of the meter sampling characteristics and the supporting information technology (IT) infrastructure. In addition, the transmission rate for a smart meter may be adjusted at any point according to changing conditions, such as expected time-constants for load changes.

According to techniques described herein, a computing device may implement a procedure for determining smart meter installation locations for a given site, or set of sites, based on the goals of a user. The given site may include, for example, an industrial site, a commercial site, or a mixed use site. In addition, the procedure may be used to gain insight at different levels of the consumption hierarchy, including sites, buildings, panels, subpanels, end loads, or the like. Such a procedure may result in a reduction in the cost of smart metering to gain insight into point-of-use consumption, and may be used to advise users about the types of insights that are likely to become available prior to the installation of the smart meters.

Figure 1:
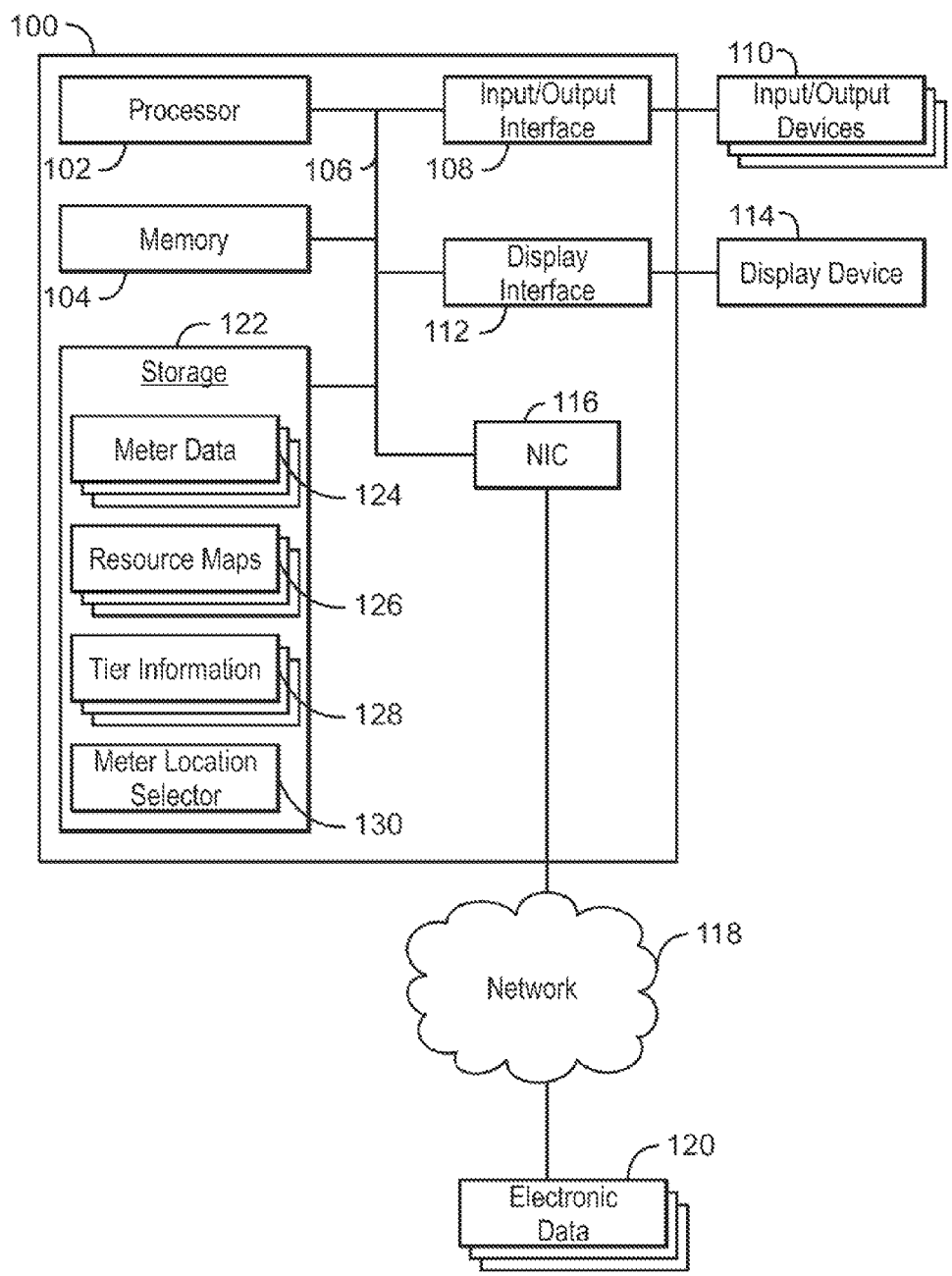
FIG. 1 is a block diagram of a computing device that may be used in accordance with examples.

FIG. 1 is a block diagram of a computing device 100 that may be used in accordance with examples. The computing device 100 may be any type of computing device that is capable of implementing the procedure described herein for determining smart meter installation locations. For example, the computing device 100 may be a laptop computer, desktop computer, tablet computer, mobile device, server, or the like. In addition, the computing device 100 may be a central station or utility for the collection of consumption data from any number of communicably coupled smart meters (not shown).

The computing device 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory (RAM), read only memory (ROM), flash memory, or any other suitable memory systems. The instructions that are executed by the processor 102 may be used to implement a method that includes determining installation locations for smart meters based on a resource map relating to a particular site.

The processor 102 may be connected through a bus 106 to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. Furthermore, the I/O devices 110 may be built-in components of the computing device 100, or may be devices that are externally connected to the computing device 100.

The processor 102 may also be linked through the bus 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100.

A network interface controller (NIC) 116 may be adapted to connect the computing device 100 through the bus 106 to a network 118. The network 118 may be a wide area network (WAN), local area network (LAN), or the Internet, among others. Through the network 118, the computing device 100 may access electronic data 120. The computing device 100 may also download the electronic data 120 and store the electronic data 120 within a storage device 122 of the computing device 100.

The storage device 122 can include a hard drive, an optical drive, a thumbdrive, an array of drives, or the like. As discussed in further detail below, the storage device 122 may include consumption data 124 collected from any number of smart meters located at any number of different sites. For example, the consumption data 124 may be the electronic data 120, which may be obtained from any number of smart meters via the network 118. The storage device 122 may also include resource maps 126 relating to various sites, as well as tier information 128 relating to the characteristics of the resource maps 126. In addition, the storage device 122 may include a meter location selector 130 that is adapted to determine recommended installation locations for smart meters at a site using corresponding consumption data 124, one or more resource maps 126, and tier information 128 for the site. The meter location selector 130 may be any type of application or program that is capable of providing such functionalities.

It is to be understood that the block diagram of FIG. 1 is not intended to indicate that the computing device 100 is to include all of the components shown in FIG. 1. Further, the computing device 100 may include any number of additional components not shown in FIG. 1, depending on the details of the specific implementation.

The techniques described herein may relate primarily to the installation of smart meters for collecting electricity, water, or natural gas consumption data. However, the smart meters may also be used to collect any other types of consumption data, depending on the details of the specific implementation.

The procedure for determining the smart meter installation locations may be a hybrid modeling-metering approach that includes adding a small number of additional smart meters to an existing site. Such a procedure may be based on model-based approximations at each tier within a hierarchy of the site, which may be used to gradually create a composite representation of consumption across the site. Using such a composite representation, a user, such as a facility owner, can successively identify hotspots, or areas of high consumption, within the site and increase the granularity of measurement and modeling until the desired level of certainty is attained.

As discussed above, smart meters may be used to monitor the amount of electricity used by a particular site by collecting energy consumption data. In some cases, it may be desirable to determine appropriate installation locations for smart meters in a building. For such cases, resource baselining may be performed to generate a resource map of the energy inflows and outflows of the building. The resource map may include the distribution of energy use throughout the building, including the consumption at the main utility in-feed and the consumption at individual end loads. In addition, branch tiering may be performed to determine separate levels, or tiers, of the building using the resource map. For example, tiers may be determined from the resource map based on the location of a distribution panel in relationship to the main building feed. The tier locations may be determined based on building size and construction, for example.

Tree diagrams of electricity distribution for the building may be used to identify the distribution hierarchy that will influence meter installation decisions and will be used in pairing end loads with appropriate electricity feeds. However, in many cases, up-to-date tree diagrams of electricity distribution are not available due to historical, undocumented building modifications or renovations. In such cases, these tree diagrams are created before proceeding with any AMI solution.

According to some examples, a predictive model of expected electricity use is generated. The predictive model may be used to identify approximate statistics of the building's resource use, as well as to evaluate what insights might be availed from subsequent meter deployment. One method for creating a predictive model involves estimating energy consumption for end loads within a building. These estimates can be made using individual equipment and fixture power specifications paired with expected hours of operation. This end load data can either be collected for existing building end loads, e.g., taking into account possible variations in power rating or operating time for equipment, or a representative sample of each end load type can be estimated and applied universally throughout the building.

In addition, as an alternative, a predictive model for electricity use can be developed using published averages of energy use for typical commercial buildings. For example, it may be assumed that the average commercial building consumes 16.4 kWh/sq. ft. each year. Thus, the annual energy consumption may be estimated using the building area in square footage. Further, published percentage data for typical end load allocations or estimated annual consumption of end load categories can be used to develop the predictive model. This approach may provide a generic estimate of building energy use, and may be used as a complementary or preliminary step to installing smart meters for monitoring the energy use.

According to techniques described herein, a determination may be made regarding what information can be gathered with no metering investment, e.g., using only information from utility bills. In order to accomplish this, the main building feed may be identified, since the main building feed is used by a utility company for billing purposes and, therefore, is likely to already include a meter. From this main building feed information, the overall electricity consumption of the building may be determined and, given information about the building size, e.g., total square footage, the electrical consumption intensity normalized per square foot may be determined. This statistic can then be used to compare the electrical consumption intensity to an average, or comparable, building.

If the meter employed by the utility company is a smart meter, time-interval data can also be extracted. Time-interval data collected from smart meters may include hourly, daily, or weekly readings. The time-interval data may be used to identify periods throughout the day in which electricity use peaks. In regions in which peak pricing is significantly higher than non-peak pricing, this knowledge may encourage adjustments in equipment operation times. Additionally, such live time-interval data can indicate a base load, or the electricity being used during non-operational hours. In buildings that maintain a typical work hour schedule, this information can prove useful in identifying loads operating during hours when a budding is unoccupied. Although utility data can offer a valuable opportunity for comparing a particular building with an average building, utility data does not provide insight into exactly where electricity is being consumed. Therefore, such information may be determined according to a hybrid approach.

The proposed hybrid approach involves using measured data from the site meter to calibrate the average model. For example, an energy use intensity (EUI) based model that leverages available statistical data may be compared to the actual energy use for the building. A local correction factor $\chi_i$ may be introduced. The local correction factor $\chi_i$ may compensate for local characteristics that may not be adequately addressed in the average data. According to this approach, given a site with N buildings, with the i-th building having an expected energy use intensity of $EUI_i$, the total intensity of the site may be calculated as shown below in Eq. 1.

$$E = \Sigma_{i=1}^{N} \chi_i A_i EUI_i \quad (1)$$

The local correction factor $\chi_i$ may be a composite representation based on factors such as weather, building orientation, age, construction materials, load variability, seasonality, or the like. Alternatively, regression coefficients based on a fit of historical meter data may be used in lieu of a single correction factor. In other words, if $EUI_i = f(x_1, x_2, \ldots, x_n)$, wherein the values of $(x_1, x_2, \ldots, x_n)$ are known through modeling, then the local correction factor x, may be determined according to Eq. 2.

$$\chi_i = \omega_1 x_1 + \omega_2 x_2 + \ldots + \omega_n x_n \quad (2)$$

Through such hybridization, some of the inaccuracies associated with the use of modeling data may be reduced. In addition, the simplicity of site-level characterization maybe retained regardless of whether detailed site-specific inputs, which may often be difficult or time-consuming to collect, are available.

Branch tiering for electrical applications may be performed to identify a number of tiers within a resource map relating to a particular site, such as campus or a building. First, Tier I panels may be identified. In the case of a campus, Tier I meters may allow for the determination of total energy consumption of each separate budding. In the case of a building, Tier I meters may allow for the determination of total energy consumption of each region, or distinct area, within the building. Examples of these hierarchies are discussed below with respect to FIGS. 2 and 3.

Figure 2:
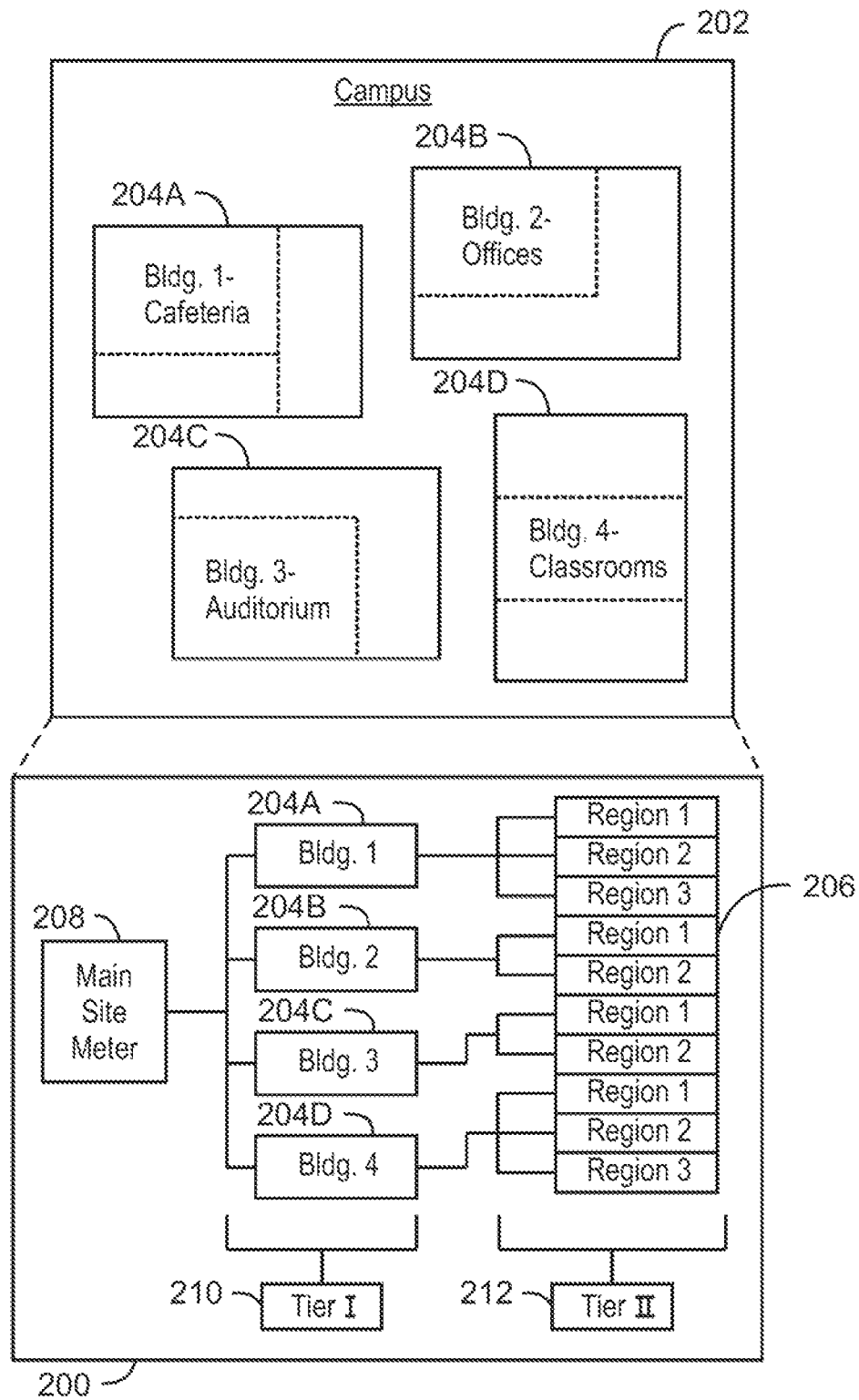
FIG. 2 is a block diagram of a resource map for a theoretical campus.

FIG. 2 is a block diagram of a resource map 200 for a theoretical campus 202. The resource map 200 may be a tree diagram that includes resource inflows and outflows for specific areas of the campus 202. The specific areas may be geographic, zonal, or functional.

As an example, the campus 202 may include four separate buildings 204A, 204B, 204C, and 204D, each containing two or three distinct regions 206. The regions 206 are depicted in blocks 204A, 204B, 204C, and 204D as areas separated by dotted lines. The corresponding resource diagram 200 shows how a main site meter 208 feeds each of the four buildings 204A, 204B, 204C, and 204D. In addition, each building 204A, 204B, 204C, or 204D feeds a panel that corresponds to each specific region 206 within that building 204A, 204B, 204C, or 204D. As shown in FIG. 2, Tier I classification 210 includes the building-level panels, since the building-level panels represent the first stage of electricity distribution from the main site meter 208. Similarly, Tier II classification 212 includes the specific region-level panels.

Figure 3:
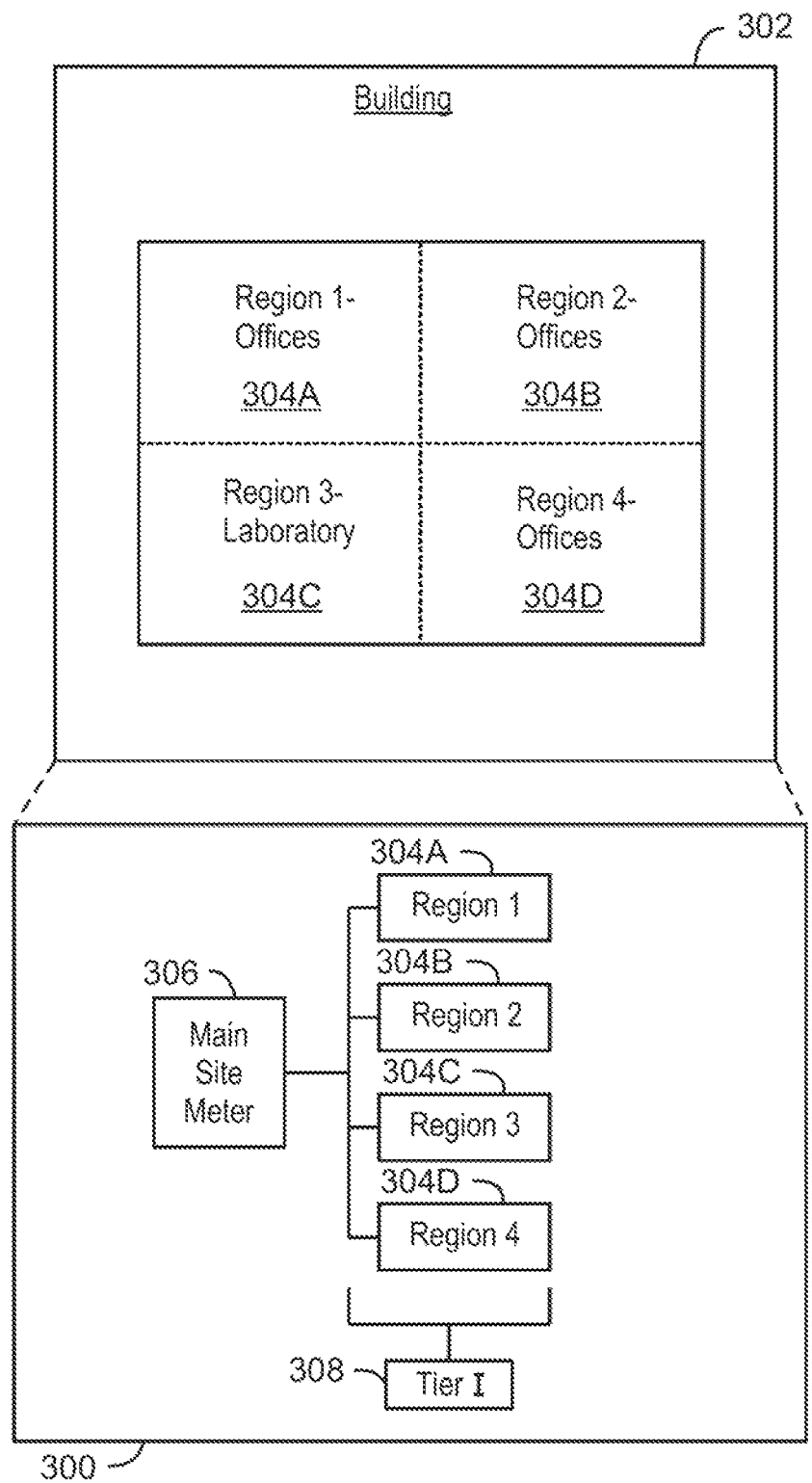
FIG. 3 is a block diagram of a resource map for a site including a single building.

FIG. 3 is a block diagram of a resource map 300 for a site including a single building 302. The building 302 may be divided into four distinct regions 304A, 304B, 304C, and 304D. A main site meter 306 may feed all of the regions 304A, 304B, 304C, and 304D. As shown in FIG. 3, a Tier I classification 308 includes the region-level panels, since the region-level panels represent the first stage of electricity distribution from the main site meter 306.

Empirically, determining the Tier I classification for a site may include measuring the branches off the main site meter, assuming that one sub-branch feeds into each building or region and that no other loads are on site. However, it is to be understood that the main site meter may also be represented by the sum of each building meter. In terms of modeling, energy use at Tier I may be based on Eqs. 1 and 2, discussed above, where each building or region is simply represented by a homogeneous or composite site for which the average electricity is known from statistical data of similar representative examples. Shared infrastructure such as site chillers or cooling towers could either be distributed across each building or region (possibly weighted by the expected load of each building or region), or simply assigned to the building or region through which the electrical feed reaches these individual sub-systems.

According to the techniques described herein, meter feedback from Tier I can be used to identify the particular buildings (in the case of a campus) or regions (in the case of a building) that use the most electricity. Panels at the Tier I level may have a relatively high voltage, e.g. around 480V, since they consist of panels that are fed directly from the main utility in-feed of electricity. Additionally, given the area, e.g., the square footage, of each building or region, the energy intensity normalized per square foot, denoted by $\overline{E}_i$, may be calculated as shown below in Eq. 3.

$$\overline{E}_t = \frac{E_t}{A} \quad (3)$$

In addition, the building-level or region-level normalized energy intensity can be compared to the average energy intensity for commercial buildings or regions, as shown below in Eq. 4.

$$\varepsilon_i = \frac{\overline{E}_t}{EUI_i} \quad (4)$$

For instance, if one region is made up entirely of office space, the normalized energy intensity $\overline{E}_i$ of the region may be compared to the average energy use intensity $EUI_t$ of a typical office building. In the same way, if an entire region consists of a data center, the normalized energy intensity $E_i$ of the region may be compared to the average energy use intensity $EUI_i$ for data centers.

After the Tier I panels have been identified for a particular site, a number of Tier II panels may be identified. The Tier II panels may be identified as the panels that are fed directly by the Tier I panels. The Tier II panels typically have voltages that are equal to or less than the voltages of the Tier I panels, since the Tier II panels are lower in the distribution hierarchy. The number of panels in the Tier II classification may be higher than the number of panels in the Tier I classification, since branches begin to spread to more local regions throughout the buildings or regions.

Tier II panels may be described using a zonal approach or a functional description approach. According to the zonal approach, the building may be segmented based on the type of infrastructure contained in the building. Specifically, the system may be segmented based on high-density versus low-density characteristics. For example, a building on an industrial site may be disaggregated into zones corresponding to a computer room, office area, laboratories, kitchen, and the like. Alternatively, according to the functional description approach, functional descriptions can be used to categorize the building by type of load. The type of load may include, for example, lighting, HVAC, appliances, receptacles, and the like.

Figure 4:
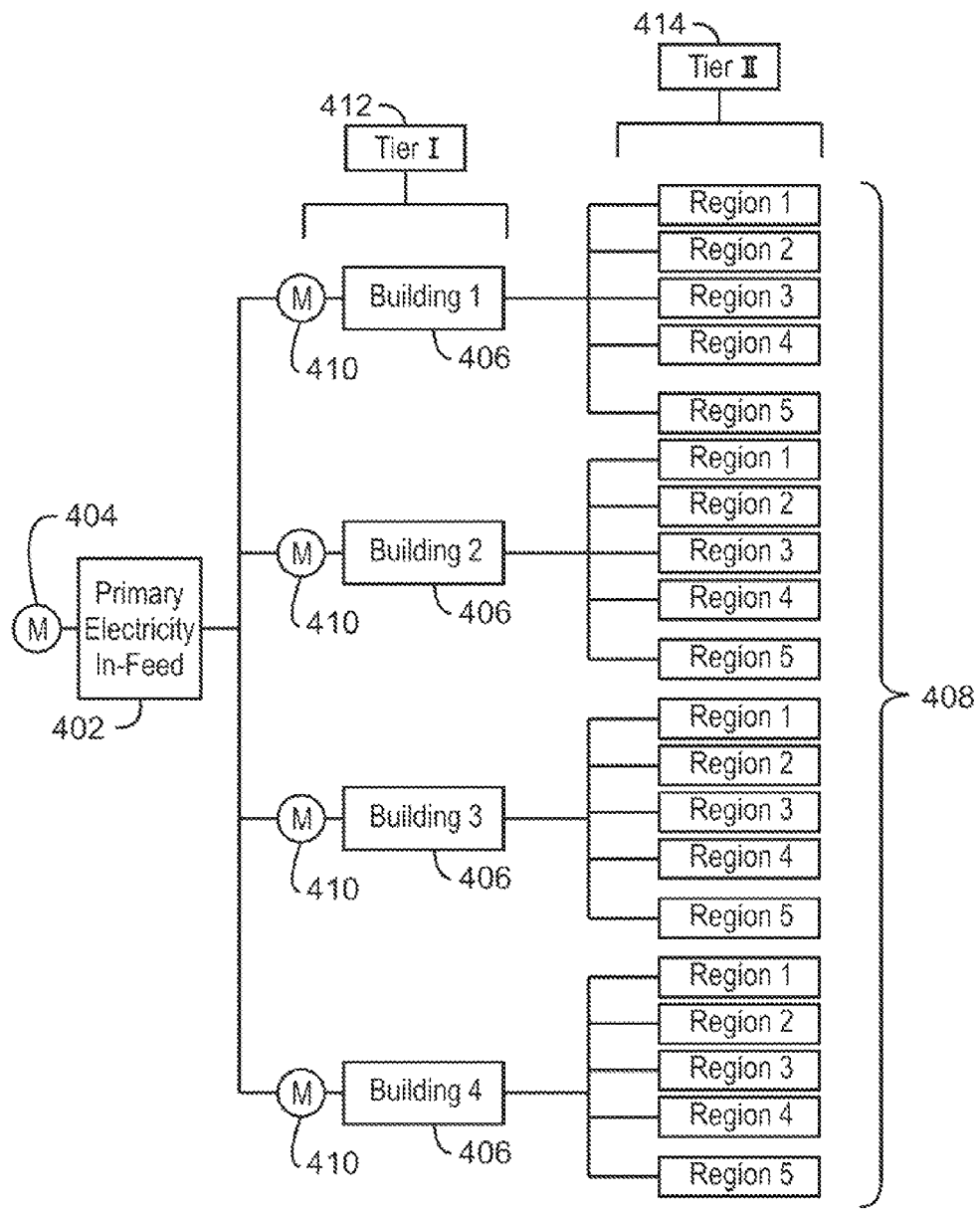
FIG. 4 is a block diagram of a resource map showing a tier hierarchy for a campus.

FIG. 4 is a block diagram of a resource map 400 showing a tier hierarchy for a campus. The resource map 400 may include a main electricity in-feed 402 for the campus. The in-feed 402 may also include the first distribution panels that send electricity to each of the next level panels. A utility meter 404 for the campus may reside at, for example, just upstream of, the main electricity in-feed 402. As shown in FIG. 4, the campus may include a number of buildings 406, and each building 406 may include a number of regions 408. In addition, a smart meter 410 may reside within each building 406.

A Tier I classification 412 for the campus may include building-level distribution panels, e.g., one distribution panel for each of the buildings 406. A Tier II classification 414 for the campus may include region-level distribution panels, which branch from the building-level distribution panels. In addition, the resource map 400 may include any number of additional Tier classifications not shown in FIG. 4. As the Tier levels progress, the number of branches within each Tier may continue to multiply. For example, Tier ill may contain more branches than Tier II, and Tier IV may include more branches than Tier III.

At the metering stage of Tier II, investment costs typically increase. However, at the same time, meter readings yield more information about where electricity is flowing. With Tier II meters installed, information about the manner in which electricity is being used may be obtained. Also, a combination approach may be implemented for end load classification. Since meter installation at the Tier III stage and beyond is often extremely costly, meter readings may be paired with bottom-up estimations about end load electricity demands at the Tier II stage.

In order to make estimations as part of the combination approach, a variety of end load assumptions may be made. As an example, it may be assumed that equal amounts of electricity are being distributed to each of the branches within an electrical panel, regardless of each unique load label. Such an assumption may allow for gross approximation of sub-loads, and may result in a decrease in cost and time.

An alternative way to quantify panel end load use is to utilize generalized estimates of typical electricity uses for common loads, such as lights or receptacles. Assumptions about the operating times of these loads can be paired with expected end load power demands to develop an estimate of electricity consumption. Such typical electricity end loads can then be expected to make up some proportion of each panel, which can be subtracted from the panel meter reading. Thus, for the meter value of a specific panel, it may be assumed that the atypical loads consume the remainder of electricity going through the particular meter. Then, for simplicity, electricity allocations to the remaining atypical loads may be divided equally, since additional information about those end load demands may not be available. This approach may result in a decrease in end load inaccuracies that might otherwise arise from equal allocation assumptions.

According to some examples, a ranking or weighting system may be used to differentiate smaller, lower demand end loads from higher demand end loads on a scale of 1-5, respectively. A higher rank may be associated with a higher energy consumption, and vice versa. The use of such a ranking system may also result in a decrease in end load inaccuracies.

During the implementation of the combination approach, it may be assumed that branch labels on the panel directory are installed as-written. Then, a classification system may be developed based on end load location and end load type. For example, for an average office building, the end load locations may include categories such as office, common room, cafeteria, and outdoor area. The end load locations for alternative-use buildings may include additional categories such as laboratories, data centers, warehouses, or other building-specific areas. For an average office building, end load types may include lighting, receptacles, HVAC (heating, ventilation, and air-conditioning), and other equipment. With these classifications and meters in place, building-level percentages of electricity used by end load location and building-level percentages of electricity used by end load type may be determined. These end load percentages can be compared to disaggregated data from an average building. In addition, the end load percentages may be valuable in identifying where building upgrades can result in a significant decrease in energy use.

According to the techniques described herein, the Tier II panels may be determined by disaggregating measurements from each Tier I panel based on the expected consumption of the equipment loading the branches that feed off the panel. More specifically, each panel may be treated as a control volume with a known electrical input load. By weighting each of the outflows from this control volume against the expected downstream load, an estimate of the distribution by function or zone can be achieved. Specifically, for a panel j carrying k categories of load, if $n_k$ represents the number of branches carrying the same load category, then Eq. 5 is valid.

$$E_j = \Sigma_k n_k E_k \quad (5)$$

For example, consider a panel feeding a data center with only two types of loads, e.g., cooling and computing. Thus, k=2 for the panel. From statistical models, it may be determined that the cooling load in the data center is half that of the load from the computing equipment, e.g., $E_1$=0.5 and $E_2$=1. Further, assume that three branches from the panel feed the cooling equipment, and the remaining five branches feed the computing equipment, i.e., $n_1$=3 and $n_2$=5. It may be determined that 23% of the measured panel load is to be allocated to the cooling equipment, and the remaining 77% of the measured panel load is to be allocated to the computing equipment. Thus, in spite of the fact that the computing equipment may only be 66% of the aggregate data center load, and only 5 out of 8, i.e., 62.5%, of the branches are feeding the computing load, as much as 77% of the load on that specific panel may be coming from the computer equipment. Therefore, relying solely on either a modeling approach or a metering approach for this panel may underestimate the contribution to computing loads and overestimate the contribution to cooling loads.

Tier III and any lower-level tiers are often site-specific. Therefore, generalized approaches for Tier III sub-panel estimates, or lower-level sub-panel estimates, may be difficult, in some cases, if an end load is known to be a significant contributor to the zone or function under consideration, direct instrumentation of the end load may be more appropriate than a hierarchal approach. In other cases, depending on the breadth of the tree at the lower-level tiers, gradually drilling down along particular branches until the significant end loads are identified may be an appropriate strategy. Alternatively, for cases in which the level of detail involved in detailed n-tier instrumentation parallels the level of detail involved in more comprehensive and accurate building simulation models, such tools may be used in lieu of added instrumentation. The appropriate approach for lower-level tiers may be determined based on the trade-off between increased metering and the added cost of lower-level representation.

It is to be understood that, while the equations described above relate to energy consumption data, the equations may be generalized to relate to any other type of consumption data. For example, similar equations may be used to determine information relating to water consumption data or natural gas consumption data.

As discussed above, in addition to electrical loads, smart meters may also be used to monitor the amount of water used by a particular site. This may be performed by collecting water consumption data. For example, water use within a budding may be mapped by first identifying the one or more main in-feed sources. The main in-feed sources are the sources that the utility company meters for billing purposes. A main in-feed source for a building often occupies the largest pipe and forms a closed loop throughout the site, and other feeds may act as branches of the main in-feed source. The diameters of the branch pipes are often smaller than the main in-feed loop and feed loads locally throughout the building.

Typically, water distribution maps of a building are available. Such water distribution maps often include the main in-feed sources, as well as distribution pipe locations, pipe size, and direction of water flow throughout the building. End load locations, such as sinks, toilets, or the like, for a building may be identified from a corresponding water distribution map. In addition, using the distribution map and knowledge of the end load locations, the pipes within the building that are responsible for feeding each load can be identified.

Unlike electricity, in which a top-down method may be used to classify end loads, water end loads may be classified using a bottom-up approach. That is, instead of beginning with the main in-feed, assumptions may be made about end uses to develop a categorization system. In contrast to electricity, this is feasible because the number of water end loads is typically significantly lower than electricity end loads. This allows for the estimation of water consumption for each individual end load with information about fixture water consumption and estimated hours of operation. Fixture consumption information can be obtained from manufacturer specifications, and is usually reported as volume of water consumed per unit time for frequency, as in the case of toilets).

In order to gain insight about water consumption within a building, predictions can be made in much the same way as for electricity. One method to gather water use data is based on individual end loads within a building. For example, specifications can provide flow rates for common, building-specific fixtures. Using estimations for operation time or use frequency per year can yield annual water consumption data. The end loads within a building might include sinks, toilets, showers, irrigation sprinklers, chillers, dish washers, and other building-specific loads. Such a predictive model may or may not take into account seasonal fluctuations that tend to cause variation in volumes, such as irrigation water. This model offers a relatively quick and low-cost way to predict building water use according to end load type.

As an alternative, a predictive model for water consumption can be developed based on average water intensity for typical commercial buildings. The predicted total water use may be found using a typical water intensity value in gallons per square foot (GSF) and building size, e.g., square footage. This approach may allow for the quick generation of the estimated water consumption total.

An assessment of water use may take place before any meters are installed. For example, an assessment of water use may be based on utility bills without any added instrumentation costs. Utility bills are often already divided into two categories, irrigation water and indoor water. From this data, percentages of both irrigation and indoor water can be identified on a per month basis. For typical office buildings, month-to-month readings of indoor water use may remain relatively constant. Alternatively, irrigation water use is often found to be directly correlated with seasonal weather and rainfall patterns. If, instead, irrigation water consumption remains constant throughout the year in a region of inconsistent temperatures and rainfall amounts, this information can be used to develop a more climate-sensitive approach to irrigation. If, as expected, irrigation water consumption fluctuates according to season, an average may be used based on the previous twelve months of utility data.

Tier I metering allows for the estimation of water use on a per-branch basis. The volume of water used by each identified branch can be approximated by obtaining estimated annual volume consumptions for fixtures within a building. The estimated annual volume consumptions may be found through a site audit, or may be determined using fixture specifications paired with estimated annual hours of operation. Based on these estimates, the total water consumption of end loads may be identified. For each individual branch, proportions of total flow may be assigned to each load. Once meters are installed, estimated water consumption in units of hundred cubic feet (HCF) for each subsequent load can be found by multiplying the branch meter reading by the end load proportion value.

A classification system may be determined based on metered values reported for each branch of a building. The classification system may be used to distinguish between end use types. End use classifications might include use areas, such as kitchens, restrooms, laboratories, processing areas, or the like, or use loads, such as showers, sinks, or the like. Such end use classifications may be determined according to the specific building type.

Smart meters may also be used to monitor the amount of natural gas used by a particular site via the collection of natural gas consumption data. A bottom-up approach may be used to perform resource mapping for natural gas applications. According to the bottom-up approach, a natural gas distribution may be determined, beginning with end loads. As with water end loads, there are significantly fewer pieces of natural gas-consuming equipment in many buildings than electricity-consuming equipment. The small number of natural gas end loads makes bottom-up characterization quick and easy. Buildings often have a previously-generated map relating the natural gas distribution. These distribution maps show pipe locations and sizes within the building. End loads, or equipment or processes that use natural gas during operation, may be identified. Such equipment may include, for example, boilers, hot water heaters, cooking equipment, or the like. Using the natural gas distribution maps and end load locations, end loads may be assigned to the appropriate feed pipes.

The typically small variety of natural gas-consuming equipment that exists within a building makes predictive modeling for natural gas relatively easy. Volume estimations can be made based on the appliance specifications, e.g., the maximum heating input, the estimated percentage of maximum input of the appliance operation, and the estimated annual hours of operation for the equipment. This model can be used to effectively determine high-level natural gas use expectations for a building.

Another option for a natural gas predictive model involves utilizing published data for typical office budding natural gas intensity. This estimation can be made using the published value for gas intensity, e.g., measured in therms/square foot, wherein 1 therm=100,000 BTUs, and the area of the budding, e.g., measured in square footage. This model can be used to quickly determine high-level natural gas use expectations for a building.

Only the total natural gas consumption for a building can be identified using information from utility bills without any added instrumentation. If building area is known, the intensity of natural gas consumption can be calculated and compared to the intensity for an average building. In addition, a predictive model or end load estimations, or both, may be used to gain insight into end use consumption of natural gas.

Tier I metering may be implemented on the equipment expected to have the highest natural gas demand within the building. Often, after predictive modeling is carried out, boilers are identified as having the highest natural gas demand for a building. Therefore, the first tier of metering may be directed at monitoring boiler natural gas consumption. Conclusions about remaining, unmetered equipment can be made using the data relating to the highest-consumption equipment. If many unique types of natural-gas consuming equipment exist within a building, it may be desirable to install additional meters to distinguish between remaining load demands. However, since there are often only two types of equipment within a building that utilize natural gas, additional metering may not be desirable. At the Tier I level of instrumentation, percentages of end load natural gas use may be assigned according to equipment types. Additionally, operation hours for each piece of metered equipment can be estimated based on total gas consumption and heating input. Such information may be used to determine possible changes to the operating schedule for equipment.

According to the techniques described above, if a large amount of natural gas consumption remains unaccounted for after metering the boilers, and a wide variety of natural-gas consuming equipment exists in the building, it may be desirable to install additional meters. For example, Tier II meters may be installed in the equipment that is suspected to use the second-highest volume of natural gas. With data collected for boilers and next-tier equipment, percentages according to end load type can be identified with more accuracy. This level of disaggregated usage information may allow a building operator to make informed decisions about which equipment to replace or upgrade.

A technique may be used to perform a general site audit for the three types of resources, i.e., electricity, water, and natural gas, for a particular site. First, resource mapping may be performed to establish the flow of each resource. In some cases, a particular resource progresses through a hierarchy, while, in other cases, the resource is distributed throughout regions of the site in a loop or branching system. Second, information from the utility provider may be used to determine the resource consumption intensity for each resource, given the site area. Third, meters may be installed at the site's top-level resource consumption tier. In some cases, this tier may be represented at a building level. In other cases, this tier may be represented by the process or equipment responsible for the largest consumption of a particular resource. If very few categories of end loads exist, this step may be sufficient to classify end load consumption for a particular resource. In many cases, however, additional steps may be performed to achieve more insight into end load consumption. Fourth, meters may be installed at the next-highest tier of resource consumption. In some cases, this tier may be represented by distinct regions throughout a building. In other cases, this tier may include the process or equipment that is suspected to use the second-largest amount of the specific resource. This step may be repeated any number of times depending on the number of tiers and end loads that exist for each resource, as well the desired level of confidence in end load classifications that is to be achieved. In addition, the metering data described above can be paired with assumptions and estimations of end load resource consumption. For instance, if a tier hierarchy is extensive and metering solutions do not penetrate to lower-level end loads, estimates of end load allocation may be useful.

Figure 5:
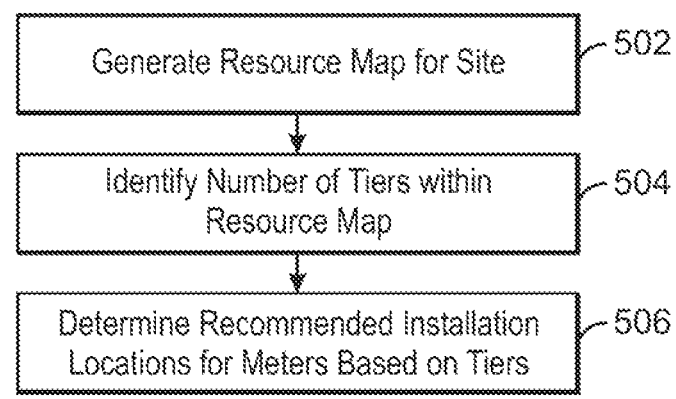
FIG. 5 is a process flow diagram showing a method for determining installation locations for meters.

FIG. 5 is a process flow diagram showing a method 500 for determining installation locations for meters. The method 500 is performed by any suitable type of computing device, such as the computing device 100 discussed above with respect to FIG. 1. The method 500 is performed by a computing device due to the fact that performing the method 500 manually would be prohibitively expensive and time-consuming.

The meters discussed with respect to the method 500 may be smart meters that are adapted to wirelessly communicate consumption data to one or more computing devices at predetermined frequencies. For example, a smart meter may communicate consumption data readings to a computing device hourly, daily, or weekly. The consumption data may then be stored by the computing device for future use. Therefore, the installation of smart meters at a site may enable users, e.g., site managers or operators, to access both historical and live consumption data relating to resources being used by the site.

The method begins at block 502, at which a resource map for a site is generated. The resource map may include inflow locations and corresponding outflow locations, or points of consumption, for a resource. The resource may be electricity, water, or natural gas. The site may be a campus, building, or specific region of a building, depending on the details of the specific implementation.

At block 504, a number of tiers within the resource map are identified. The tiers may be identified based on distances between the inflow locations and the corresponding outflow locations for the resource. The tiers may be included within a hierarchy, wherein each tier within the hierarchy includes one or more branches within the resource map. In addition, each tier within the hierarchy may be classified based on a particular level of the tier. In some cases, the tiers may be divided according to a baseline tier classification, a Tier I classification, a Tier II classification, and so on. For example, the baseline tier classification may include the point at which a resource flows into a campus and the utility meter is located. The Tier I classification may include the buildings into which the resource flows. The Tier II classification may include different panels that distribute the resource flows from each of the buildings.

At block 506, recommended installation locations for meters are determined based on the tiers. The recommended installation locations may be prioritized in a descending order beginning with installation locations associated with a top tier, or may be prioritized in an ascending order beginning with installation locations associated with a bottom tier.

In addition, the recommended installation locations may be prioritized based on constraints specified by a user of the computing device. Such constraints may include, for example, an overall budget for installing the meters, a fraction of resource costs to be metered, or a desired extent of resource characterization. For example, if the user desires to quantify total resource use or cost, only a single meter at the top tier may be recommended. On the other hand, if the user desires to quantify the end loads, multiple meters at the bottom tier may be recommended.

In some cases, the recommended installation locations are determined based on the homogeneity of locations across the entire infrastructure in a top-down fashion. For example, starting at a top tier, an installation location may be recommended at the lowest location at which successive loads are homogeneous.

It is to be understood that the process flow diagram of FIG. 5 is not intended to indicate that the steps of the method 500 are to be executed in any particular order, or that all of the steps of the method 500 are to be included in every case. Further, any number of additional steps not shown in FIG. 5 may be included within the method 500, depending on the details of the specific implementation.

According to the method 500, consumption data collected from the installed meters may be displayed to a user. For example, the consumption data may be standardized and visually presented to the user in a pre-specified format via a display device. In addition, the recommended installation locations and recommendations about further metering investments or resource management may be displayed to the user.

The method 500 may also include analyzing consumption data collected from installed meters to determine whether any of the installed meters are positioned at redundant locations. For example, if two meters installed on different branches are providing substantially the same information, one of the meters may be considered to be redundant. Recommended new installation locations may then be determined for the installed meters that are positioned at the redundant locations.

Figure 6:
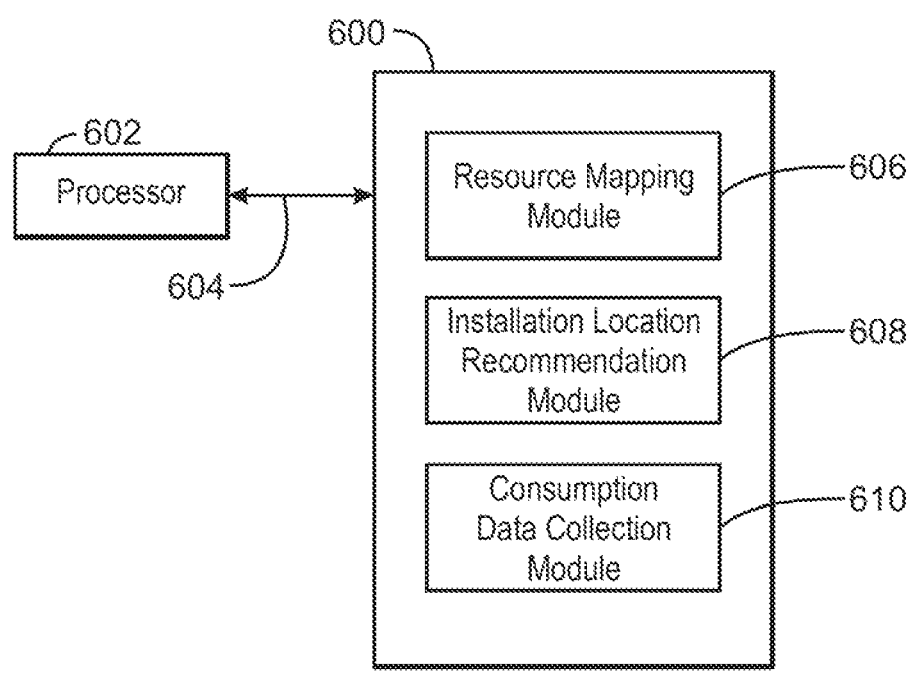
FIG. 6 is a block diagram showing a tangible, non-transitory, computer-readable medium that stores a protocol adapted to determine installation locations for meters.

FIG. 6 is a block diagram showing a tangible, non-transitory, computer-readable medium 600 that stores a protocol adapted to determine installation locations for meters. The tangible, non-transitory, computer-readable medium 600 may be accessed by a processor 602 over a computer bus 604. Furthermore, the tangible, non-transitory, computer-readable medium 600 may include code to direct the processor 602 to perform the steps of the current method.

The various software components discussed herein may be stored on the tangible, non-transitory, computer-readable medium 600, as indicated in FIG. 6. For example, a resource mapping module 606 may be adapted to generate a resource map for a resource being used by a particular site. The resource mapping module 606 may also be adapted to identify a hierarchy of tiers within the resource map. An installation location recommendation module 608 may be adapted to recommend installation locations for meters based on the resource map generated by the resource mapping module 606. In addition, a consumption data collection module 610 may be adapted to collect consumption data from installed meters, and to use such data to determine new recommended installation locations for the meters.

It is to be understood that FIG. 6 is not intended to indicate that all of the software components discussed above are to be included within the tangible, non-transitory, computer-readable medium 600 in every case. Further, any number of additional software components not shown in FIG. 6 may be included within the tangible, non-transitory, computer-readable medium 600, depending on the details of the specific implementation.

The present examples may be susceptible to various modifications and alternative forms and have been shown only for illustrative purposes. For example, the present techniques support both reading and writing operations to a data structure cache. Furthermore, it is to be understood that the present techniques are not intended to be limited to the particular examples disclosed herein. Indeed, the scope of the appended claims is deemed to include all alternatives, modifications, and equivalents that are apparent to persons skilled in the art to which the disclosed subject matter pertains.

What is claimed is:

1. A method for determining installation locations for meters, comprising:
generating, via a computing device, a resource map for a physical site, wherein the resource map comprises physical inflow locations at which a utility resource is input, corresponding physical outflow locations at which the utility resource is output, and intersection points, each intersection point corresponding to a physical inflow location at which the utility resource is input and the physical outflow locations at which the utility resource is directly output from the physical inflow location;
after generating the resource map, identifying a plurality of hierarchical tiers within the resource map based on the physical inflow locations and the corresponding physical outflow locations; and
determining a plurality of recommended installation locations for meters that measure the utility resource based on the plurality of hierarchical tiers.

2. The method of claim 1, comprising:
collecting consumption data from installed meters;
analyzing the consumption data to determine whether any of the installed meters are positioned at redundant locations; and
determining recommended new installation locations for any of the installed meters that are positioned at the redundant locations.

3. The method of claim 1, comprising determining the plurality of recommended installation locations for the meters in a descending order beginning with installation locations associated with a top tier of the plurality of hierarchical tiers.

4. The method of claim 1, comprising determining the plurality of recommended installation locations for the meters in an ascending order beginning with installation locations associated with a bottom tier of the plurality of hierarchical tiers.

5. The method of claim 1, comprising determining the plurality of recommended installation locations for the meters based on constraints specified by a user of the computing device.

6. The method of claim 1, wherein identifying the plurality of hierarchical tiers within the resource map comprises:
generating a hierarchy of the hierarchical tiers, wherein each hierarchical tier comprises one or more branches within the resource map; and
analyzing the hierarchy of the hierarchical tiers to determine an approximate amount of the resource flowing through each tier or each branch, or both.

7. The method of claim 1, comprising identifying the plurality of hierarchical tiers within the resource map based on distances between the physical inflow locations and the corresponding physical outflow locations for the utility resource, wherein the corresponding physical outflow locations comprise consumption points of consumption of the utility resource.

8. A computing system for determining installation locations for meters, comprising:
a processor that is adapted to execute stored instructions; and
a storage device that stores instructions, the storage device comprising processor executable code that, when executed by the processor, is adapted to:
generate a resource map for a physical site, wherein the resource map corresponds to the physical site and comprises physical inflow locations at which a utility resource is input, and corresponding physical consumption locations at which the utility resource is consumed, and intersection points, each intersection point corresponding to a physical inflow location at which the utility resource is input and the physical consumption locations at which the utility resource is directly consumed from the physical inflow location;
after generating the resource map, perform branch tiering for the site to identify a plurality of hierarchical tiers within the resource map based on distances between the physical inflow locations and the corresponding physical consumption locations for the resource; and
determine a prioritized set of recommended installation locations for meters that measure the utility resource based on the plurality of hierarchical tiers within the resource map.

9. The computing system of claim 8, wherein the meters comprise smart meters.

10. The computing system of claim 8, wherein the utility resource comprises electricity, water, or natural gas, or any combinations thereof.

11. The computing system of claim 8, wherein the recommended installation locations are prioritized based on an input by a user of the computing system.

12. The computing system of claim 8, wherein the recommended installation locations are prioritized in a descending order beginning with installation locations associated with a top hierarchical tier of the plurality of hierarchical tiers.

13. The computing system of claim 8, wherein the recommended installation locations are prioritized in an ascending order beginning with installation locations associated with a bottom hierarchical tier of the plurality of hierarchical tiers.

14. A tangible, non-transitory, computer-readable medium comprising code configured to direct a processor to:
generate a resource map for a physical site, wherein the resource map comprises physical inflow locations, corresponding physical consumption locations for a resource being used by the site, and intersection points, each intersection point corresponding to a physical inflow location at which the utility resource is input and the physical consumption locations at which the utility resource is directly consumed from the physical inflow location, wherein the resource comprises electricity, water, or natural gas;
after generating the resource map, perform branch tiering for the site to identify a plurality of hierarchical tiers within the resource map based on distances between the physical inflow locations and the corresponding physical consumption locations for the resource, wherein each hierarchical tier comprises one or more branches within the resource map; and
determine a prioritized set of recommended installation locations for smart meters that measure the utility resource based on the plurality of hierarchical tiers within the resource map.

15. The tangible, non-transitory, computer-readable medium of claim 14, wherein the tangible, non-transitory, computer-readable medium comprises code configured to direct a processor to:
collect consumption data from installed meters;
analyze the consumption data to determine whether any of the installed meters are positioned at redundant locations; and
determine recommended new installation locations for any of the installed meters that are positioned at the redundant locations.

* * * * *